US006570858B1

(12) United States Patent
Emmons, Jr. et al.

(10) Patent No.: US 6,570,858 B1
(45) Date of Patent: May 27, 2003

(54) SATELLITE-BASED COMMUNICATIONS SYSTEM WITH TERRESTRIAL REPEATER AND METHOD THEREFOR

(75) Inventors: Thomas Peter Emmons, Jr., Mesa, AZ (US); Robert Anthony Peters, Silver Spring, MD (US); Shawn Hogberg, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/431,641

(22) Filed: Nov. 1, 1999

(51) Int. Cl.[7] .............................................. H04B 7/212
(52) U.S. Cl. ...................... 370/321; 370/321; 370/280; 370/294; 370/293; 370/347; 455/427; 455/13.1; 455/12.1
(58) Field of Search ............................. 455/11.1, 12.1, 455/13.1, 13.2, 427, 430, 63, 501, 504, 502, 550; 370/492, 315–316, 276–277, 279–280, 294, 293, 310, 321, 326, 330, 336–337, 347

(56) References Cited

U.S. PATENT DOCUMENTS 6,108,364 A * 8/2000 Weaver et al. .............. 370/492
6,275,475 B1 * 8/2001 Emmons, Jr. et al. ...... 370/276

* cited by examiner

Primary Examiner—Doris H. To
(74) Attorney, Agent, or Firm—Ingrassia Fisher & Lorenz (57) ABSTRACT

A satellite-based communications system (20) includes a communication satellite (22) using a Time Division Duplex (TDD) frame structure. The communication satellite (22) transmits first data (63) during a first sub-frame (150) and receives second data (65) during a second sub-frame (152) of a time division multiple access (TDMA) frame (144). A terrestrial repeater (30) receives the first data (63) using a first link (36) during the first sub-frame (150), delays the first data (63) by a sub-frame duration, and transmits the first data (63) to a subscriber unit (32) using a second link (42). The terrestrial repeater (30) receives the second data (65) from the subscriber unit (32) using the second link (42), delays the second data (65) by the sub-frame duration, and transmits the second data (65) using the first link (36) to the satellite (22) during the second sub-frame (152).

20 Claims, 4 Drawing Sheets

SATELLITE-BASED COMMUNICATIONS SYSTEM WITH TERRESTRIAL REPEATER AND METHOD THEREFOR

RELATED INVENTION

The present invention is related to "System And Method For Maintaining Spectral Capacity In Time Division Duplex (TDD) Systems" by Peter Emmons and Robert Peters, U.S. patent application Ser. No. 09/094,976, filed Jun. 15, 1998.

FIELD OF THE INVENTION

This invention relates generally to communications systems, and more particularly, to satellite-based communications systems employing terrestrial repeaters.

BACKGROUND OF THE INVENTION

Satellite-based communications systems are being developed to provide ubiquitous radio communication services throughout the world. Some satellite-based communications systems include satellites placed in geosynchronous or geostationary orbital slots at altitudes of over twenty-two thousand miles. Other satellite-based communications systems include non-geosynchronous satellites (Non-GEO), such as Low Earth Orbiting (LEO) satellites that are placed at altitudes of a few hundred miles above the earth, and Middle Earth Orbiting (MEO) satellites which are placed at slightly higher altitudes than LEO satellites. The aforementioned satellite-based communications systems provide unique challenges because of the space environment.

One such challenge includes overcoming the problem of signal strength degradation when transmitting communication signals to and from the communication satellites. In part, this signal strength degradation is due to the great distance between the satellite and the receiving station, for example, an individual subscriber unit. The great distance through which the communication signals travel results in a reduction of signal intensity of the received signal due to path loss. In addition, environmental effects, known as fading, further reduce signal intensity due to reflection, refraction, and/or absorption of the transmitted communication signal. Fading is aggravated in regions cluttered by natural obstructions, such as mountainous regions, and in regions cluttered by man-made obstructions, such as the many tall buildings in urban areas. Operation inside buildings results in a particularly high fade that might prevent operation to a communication satellite.

The fade margin is the depth of fade, generally expressed in dB, that a receiver can tolerate while still maintaining acceptable signal quality. Accordingly, designers are continuously developing system components, such as antennas to allow communications systems to tolerate higher fade margins. Unfortunately, such components tend to be both complicated and costly, and antennas used in communications systems with higher fade margins tend to be larger.

In addition, to support higher fade margins, the subscriber units may operate at higher power levels. The high power operation undesirably reduces the battery life of the subscriber units. To reduce the need for the subscriber units to operate at high power levels, repeaters have been employed to perform signal processing functions on incoming radio communication signals, such as recovering, filtering, amplifying, reshaping, retiming, and retransmitting the signal. Unfortunately, repeater design is made complicated by the challenges related to satellite-based communication systems. For example, the timing factors resulting from propagation delay of the radio communication signals between the satellite and the repeater vastly complicates repeater design to solve temporal interference between up-links and down-links.

Signal quality is also degraded by interference from inadequate isolation between the uplink and downlink frequency bands being used for transmitting and receiving communication signals. The inadequate isolation problem is exacerbated when a single main mission antenna (MMA) that both transmits and receives signals is used on the satellite.

Another challenge facing designers of satellite-based communications systems is increasing and maintaining spectral efficiency. Spectral efficiency is the efficiency of a radio communications system in its use of the radio spectrum. A system that is able to efficiently utilize its radio spectrum is more likely to successfully provide radio communication services to a greater number of subscribers than a less efficient system. Thus, a system having high spectral efficiency leads to increased customer satisfaction and increased profitability of the communication system. High spectral efficiency is especially desirable in population dense regions, such as urban areas where the number of subscribers to the satellite-based communication system may be significantly higher than the number of subscribers in a less population dense region.

One technology for increasing spectral efficiency is time division multiple access (TDMA). TDMA is used to allocate a discrete temporal amount of a given frequency band to each subscriber unit in order to permit many simultaneous conversations. Each radio channel is divided into multiple frames, and each frame is divided into multiple time slots, through TDMA. The subscriber unit is then assigned a particular time slot or group of time slots in a frame for transmission.

When the uplink and downlink frequency bands are close together, a time division duplex (TDD) frame structure can be employed to overcome the problems associated with inadequate signal isolation. TDD is a method that employs TDMA for supporting full duplex communications. TDD supports transmission from the subscriber unit to the satellite through one radio frequency channel and one or more specified time slots. Another radio frequency channel and one or more time slots support transmission from the satellite to the subscriber unit. Unfortunately, this TDD approach results in one frequency being idle while the other frequency is used for transmission, which undesirably decreases spectral efficiency.

Accordingly, there is a significant need for a system and method that mitigate the problems associated with signal fading while maintaining spectral efficiency in a satellite-based communications system.

BRIEF DESCRIPTION OF THE DRAWINGS

A more complete understanding of the present invention may be derived by referring to the detailed description and claims when considered in connection with the figures, wherein like reference numbers refer to similar items throughout the figures, and:

DETAILED DESCRIPTION OF THE DRAWINGS

Figure 1:
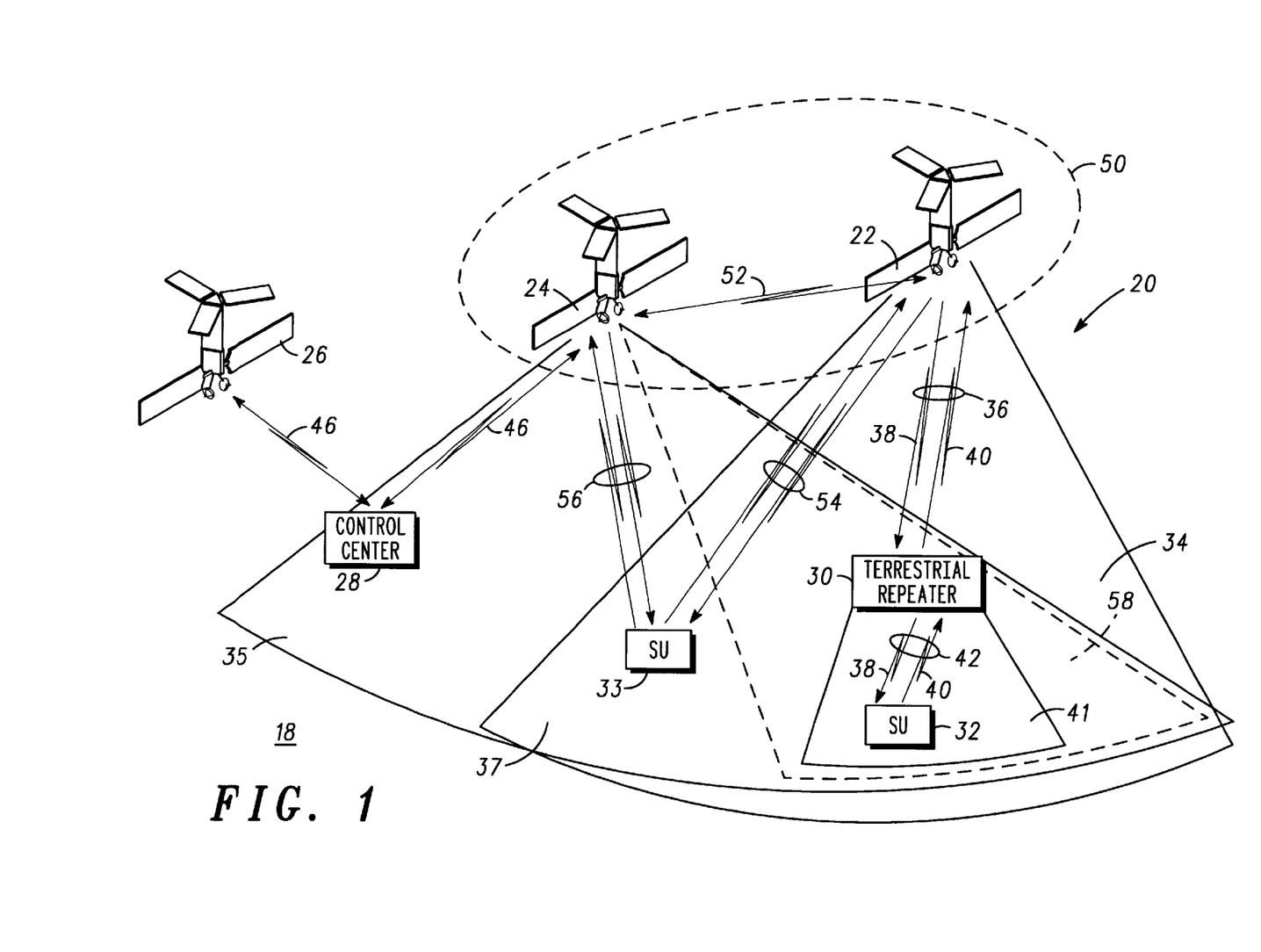
FIG. 1 shows a simplified block diagram of a satellite-based communications system in accordance with a preferred embodiment of the present invention.

FIG. 1 shows a simplified block diagram of an environment 18 in which a satellite-based communications system 20 operates in accordance with a preferred embodiment of the present invention. Communications system 20 includes first, second, and third satellites 22, 24, and 26, respectively, a control center 28, a terrestrial repeater 30, a first subscriber unit (SU) 32, and a second subscriber unit 33.

In a preferred embodiment, communication satellites 22, 24, and 26 are Non-Geosynchronous (Non-GEO) satellites, such as Low Earth Orbit (LEO) satellites, which are located in inclined orbits. In alternative embodiments, communication satellites 22, 24, and 26 can be Geosynchronous (GEO) satellites or combinations of GEO and Non-GEO satellites. Satellite communications system 20 is shown with satellites 22, 24, and 26 for simplicity of illustration. It should be readily apparent to those skilled in the art that communications system 20 includes more satellites for providing worldwide radio communication services.

Terrestrial repeater 30 is located on or near the surface of the earth, as contrasted to first, second, and third satellites 22, 24, and 26, respectively. Likewise, subscriber units 32 and 33 are located at various points on or near the surface of the earth. Satellite communications system 20 is shown with first and second subscriber units 32 and 33 for simplicity of illustration. However, it should be readily apparent to those skilled in the art that communications system 20 can accommodate a number of subscriber units.

First satellite 22 provides radio communication services in a first coverage area 34 that is defined by, among other things, the beam pattern for the antenna on first satellite 22. Likewise, second satellite 24 provides radio communication services in a second coverage area 35 that is defined by, among other things, the beam pattern for the antenna on second satellite 24. A dual coverage area 37 is established where second coverage area 35 overlaps first coverage area 34.

Control center 28 is used for sending and receiving data to and from each of first, second, and third satellites 22, 24, and 26, respectively, over RF control links 46. Control center 28 is used, among other things, to monitor and control the operation of first, second and third satellites 22, 24, and 26 within communications system 20.

In a preferred embodiment, repeater 30 is located in first coverage area 34 and is in radio communication with first satellite 22 over a first link 36. First link 36 includes a first frequency band, downlink frequency band 38, over which radio communication signals are transmitted from first satellite 22 to repeater 30. First link 36 also includes a second frequency band, uplink frequency band 40, over which radio communication signals are transmitted from repeater 30 to satellite 22.

First coverage area 34 for first satellite 22 either partially or completely overlaps a repeater coverage area 41, and repeater 30 provides radio communication services to first subscriber unit 32 located in repeater coverage area 41. Repeater coverage area 41 is defined by, among other things, the antenna characteristics for the antenna (discussed below) on repeater 30. Repeater 30 is in radio communication with first subscriber unit 32 over a second link 42. Like first link 36, second link 42 includes downlink frequency band 38 over which radio communication signals are transmitted from repeater 30 to subscriber unit 32 and uplink frequency band 40 over which radio communication signals are transmitted from subscriber unit 32 to repeater 30.

In the preferred embodiment, first satellite 22 employs a time division duplex (TDD) frame structure, and downlink and uplink frequency bands, 38 and 40, respectively, encompass a limited portion of the radio frequency (RF) spectrum allocated to first satellite 22. Downlink and uplink frequency bands, 38 and 40, may be close together. However, as discussed above, interference between frequency bands 38 and 40 is largely avoided, through the employment of the TDD frame structure at the expense of spectral efficiency. In the preferred embodiment, downlink and uplink frequency bands, 38 and 40, are effectively reused in second link 42, to take advantage of the available spectral capacity while mitigating the effects of fading through the use of terrestrial repeater 30.

As shown in FIG. 1, first satellite 22 and second satellite 24 may also form a time division duplex (TDD) pair 50 for providing radio communications services to subscriber units that are located in dual coverage area 37, but are not located in repeater coverage area 41, such as second subscriber unit 33. Satellites 22 and 24 move relative to one another, and TDD pair 50 is formed when first and second satellites 22 and 24, respectively, can communicate with one another over a crosslink 52. In environment 18, a plurality of first satellites may be coupled to a plurality of second satellites to form a plurality of TDD satellite pairs, as illustrated by pair 50.

First satellite 22 of TDD pair 50 is configured to communicate with second subscriber unit 33 over a first TDD link 54 and second satellite 24 of TDD pair 50 is configured to communicate with second subscriber unit 33 over a second TDD link 56. The channel frequency bands are controlled on a frame-by-frame basis within dual coverage area 37 to provide space diversity. In other words, two separate and independent communication paths, namely first and second TDD links 54 and 56, are used for transmitting the same information in order to mitigate the effects of fading, transmission loss, interference, and so forth.

As TDD pair 50, first and second satellites 22 and 24 are configured to operate in a dual coverage scheme as a single Time division multiple access (TDMA) platform rather than a TDD platform. In other words, during a particular TDMA frame or portion of a TDMA frame (i.e., a sub-frame) one of first and second satellites 22 and 24, respectively, is transmitting to second subscriber unit 33 while the other of satellites 22 and 24 is receiving from second subscriber unit 33. For example, first satellite 22 may use odd-numbered sub-frames for transmitting signals and even-numbered sub-frames for receiving signals. Second satellite 24 uses a complimentary frame assignment. That is, second satellite 24 may use odd-numbered sub-frames for receiving signals and even-numbered sub-frames for transmitting signals.

In a preferred embodiment of the present invention, first and second satellites 22 and 24, respectively, may communicate with a subscriber unit as TDD pair 50. Alternatively, one of first and second satellites 22 and 24 may communicate with a subscriber unit via terrestrial repeater 30 when the subscriber unit is located in repeater coverage area 41. In environment 18, first satellite 22 is in communication with first subscriber unit 32 via terrestrial repeater 30.

Accordingly, second satellite 24 refrains from transmitting and receiving over downlink frequency band 38 and uplink frequency band 40 in a sector of second coverage area 35 denoted by a dashed region 58.

Second satellite 24 may be instructed to refrain from transmitting and receiving in the sector of second coverage area 35 through command messaging transmitted over RF control link 46 from control center 28. For example, control center 28 may have location data stored in a memory element (not shown) for each terrestrial repeater 30 in communications system 20. Accordingly, control center 28 can command each of first, second, and third satellites 22, 24, and 26 when to refrain from transmitting and receiving over particular frequency bands. Alternatively, each of first, second, and third satellites 22, 24, and 26 may be programmed with a table indicating when and where to refrain from transmitting and receiving. Alternatively, the repeater may put out a pilot tone that is detected by the satellite.

Through TDD pair 50, space diversity is accomplished through the spatial separation imposed by first and second TDD links 54 and 56 from each of first and second satellites 22 and 24, respectively. Unfortunately, to achieve the desired fade margins, the space diversity implementation for second subscriber unit 33 is costly because the radio spectrum is occupied with the same information, that is, redundant data. When the radio spectrum is occupied with redundant data, it cannot be utilized to accommodate a terrestrial repeater or the additional subscribers that may be present in a population dense area.

The space diversity gained through TDD pair 50 is compromised by routing communications between first satellite 22 and first subscriber unit 32 through terrestrial repeater 30. The deleterious effects of fading are mitigated through signal routing via terrestrial repeater 30. Accordingly, communication through terrestrial repeater 30 may be especially desirable in population dense regions having many subscribers and obstructions that cause signal strength degradation. Those skilled in the art will recognize that a combination of TDD pairing, as illustrated by TDD pair 50, and signal routing through terrestrial repeater 30 may be most beneficial, increasing or maintaining spectral efficiency, and maintaining signal quality.

Figure 2:
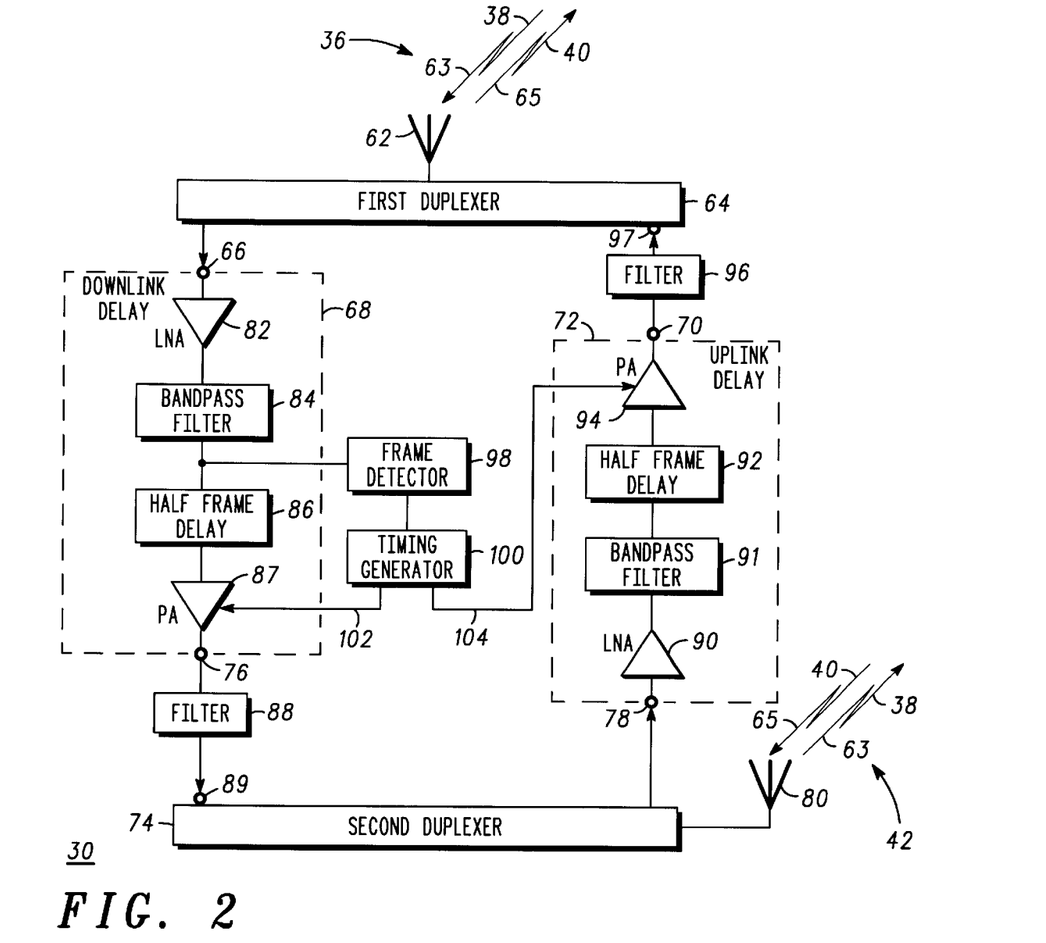
FIG. 2 shows a block diagram of the terrestrial repeater in accordance with the preferred embodiment of the present invention.

FIG. 2 shows a block diagram of terrestrial repeater 30 in accordance with the preferred embodiment of the present invention. Terrestrial repeater 30 concurrently receives transmissions from both first satellite 22 (FIG. 1) and first subscriber unit 32 (FIG. 1), delays the transmissions, and concurrently retransmits the transmissions.

Terrestrial repeater 30 transmits and receives radio communications signals to and from first satellite 22 (FIG. 1) over first link 36 at a first transceiver antenna 62. In the preferred embodiment, first transceiver antenna 62 has a radiation pattern that is directional in zenith. Thus, first transceiver antenna 62 permits half-duplex communications through the receipt of radio communication signals, i.e., first data 63, from first satellite 22 over downlink frequency band 38 of first link 36 and through the transmission of radio communication signals, i.e., second data 65, from repeater 30 to first satellite 22 over uplink frequency band 40.

First transceiver antenna 62 is coupled to a first duplexer 64, and first duplexer 64 is coupled to an input 66 of a first delay circuit, i.e., downlink delay circuit 68. Likewise, first duplexer 64 is in communication with an output 70 of a second delay circuit, i.e., uplink delay circuit 72. First duplexer 64 enables substantially concurrent receipt of first data 63 over downlink frequency band 38 of first link 36 from first satellite 22 and transmission of second data 65 over uplink frequency band 40 of first link 36 to first satellite 22.

A second duplexer 74 is in communications with an output 76 of downlink delay circuit 68, an input 78 of uplink delay circuit 72, and a second transceiver antenna 80. Like first duplexer 64, second duplexer 74 enables substantially concurrent transmission of first data 63 over downlink frequency band 38 of second link 42 to first subscriber unit 32 (FIG. 1) and receipt of second data 65 over uplink frequency band 40 from first subscriber unit 32 of second link 42.

In a preferred embodiment, second transceiver antenna 80 has a radiation pattern that is nondirectional in azimuth. Thus, second transceiver antenna 80 effectively receives second data 65 from first subscriber unit 32 (FIG. 1) and transmits first data 63 to first subscriber unit 32 within repeater coverage area 41 (FIG. 1).

Downlink delay circuit 68 includes a first low noise amplifier (LNA) 82 for receiving and processing first data 63 over downlink frequency band 38 received at input 66. An output of first low noise amplifier 82 is coupled to a first bandpass filter 84. First bandpass filter 84 substantially passes downlink frequency band 38 and attenuates other frequency bands, such as uplink frequency band 40. The first low noise amplifier 82 receives the input 66 prior to the first bandpass filter 84 in order to minimize the system noise of the repeater. However, the first low noise amplifier 82 may be alternatively coupled to the first bandpass filter 84 such that the input 66 is received by the first bandpass filter 84 prior to the first low noise amplifier 82 in order to prevent overdriving of the first low noise amplifier 82.

First data 63, carried over downlink frequency band 38, is output from first bandpass filter 84 and input into a first half frame delay element 86. First half frame delay element 86 delays the output of first data 63 by a half frame with respect to the input of first data 63 into first half frame delay element 86. Delay element 86 may be implemented using an acoustic delay line.

Following the half frame delay at delay element 86, downlink frequency band 38 is amplified at a first power amplifier 87 prior to transmission to subscriber unit 32 and is output from downlink delay circuit 68 at output 76. First data 63, over downlink frequency band 38, then passes to a first filter 88. In a preferred embodiment, first filter 88 is configured to pass downlink frequency band 38 and substantially suppress other frequency bands, such as uplink frequency band 40 which may interfere with downlink frequency band 38 in second duplexer 74. First filter 88 is coupled to an input 89 of second duplexer 74 so that processed and delayed first data 63 is input into second duplexer 74 for subsequent transmission to subscriber unit 32 (FIG. 1) over downlink frequency band 38 of second link 42 (FIG. 1).

Uplink delay circuit 72 is configured similarly to downlink delay circuit 68. Uplink delay circuit 72 includes a second low noise amplifier (LNA) 90 for receiving and processing second data 65 over uplink frequency band 40 received at input 78. An output of second low noise amplifier 90 is coupled to a second bandpass filter 91. Second bandpass filter 91 substantially passes uplink frequency band 40 and attenuates other frequency bands, such as downlink frequency band 38. As with the configuration of the downlink delay circuit 68, the second low noise amplifier 90 receives the input 78 prior to the second bandpass filter 91 in order to minimize the system noise of the repeater.

However, the second low noise amplifier 90 may be alternatively coupled to the second bandpass filter 91 such that the input 78 is received by the second bandpass filter 91 prior to the second low noise amplifier 90 in order to prevent overdriving of the second low noise amplifier 90.

Second data 65, carried on uplink frequency band 40, is output from second bandpass filter 91 and input into a second half frame delay element 92. Second half frame delay element 92 delays the output of second data 65 by a half frame with respect to the input of the data into second half frame delay element 92.

Following the half frame delay at delay element 92, uplink frequency band 40 is amplified at a second power amplifier 94 and output from uplink delay circuit 72 at output 70. Second data, over uplink frequency band 40, then passes to a second filter 96 coupled to output 70 of uplink delay circuit 72. In a preferred embodiment, second filter 96 is configured to pass uplink frequency band 40 and substantially suppress other frequency bands, such as downlink frequency band 38 which may interfere with uplink frequency band 40 in first duplexer 64. Second filter 96 is coupled to an input 97 of first duplexer 64 so that processed and delayed second data 65 is input into first duplexer 64 for subsequent transmission to first satellite 22 (FIG. 1) over uplink frequency band 40 of first link 36.

The signal filtering accomplished in conjunction with each of first and second delay circuits 68 and 72 serves to significantly prevent interference between first and second frequency bands 38 and 40 during receipt and transmission of the signals, and during the processing occurring in first and second delay circuits 68 and 72. Maintaining adequate isolation between first and second frequency bands 38 and 40 is especially desirable when first and second frequency bands 38 and 40 are close to one another. In addition, the signal filtering prevents and/or attenuates transmission of noise outside of the subject frequency band.

Terrestrial repeater 30 also includes a frame detector 98 having an input coupled to an output of bandpass filter 84 of downlink delay circuit 68 and a timing generator 100 having in input coupled to an output of frame detector 98. Frame detector 98 is in communication with first delay circuit 68 for detecting a beginning signal, or frame timing signal, of each TDMA frame. In one embodiment of the present invention, detector 98 simply detects the initial occurrence of energy in downlink frequency band 38 after a predetermined period of silence. This TDMA frame timing signal is used by timing generator 100 to establish and maintain frame alignment, i.e., synchronization, between the data received at each of first and second transceiver antennas 62 and 80, respectively and the data radiated from each of first and second transceiver antennas 62 and 80. Thus, terrestrial repeater 30 timing is referenced to the satellite frame clock of first satellite 22.

Timing generator 100 activates downlink delay circuit 68 through a downlink enabling signal 102 to provide first data 63 to second transceiver antenna 80 for subsequent transmission to subscriber unit 32 (FIG. 1). Likewise, timing generator 100 activates uplink delay circuit 72 through an uplink enabling signal 104 to provide second data 65 to first transceiver antenna 62 for subsequent transmission to first satellite 22 (FIG. 1). Of course, those skilled in the art will recognize that downlink enabling signal 102 and uplink enabling signal 104 need not be simultaneous. Rather, timing generator 100 may activate uplink delay circuit 72 through uplink enabling signal 104 prior to activating downlink delay circuit 68 to compensate for propagation delay, or the delay caused by the finite speed at which radio communication signals travel between first satellite 22 and terrestrial repeater 30.

Figure 3:
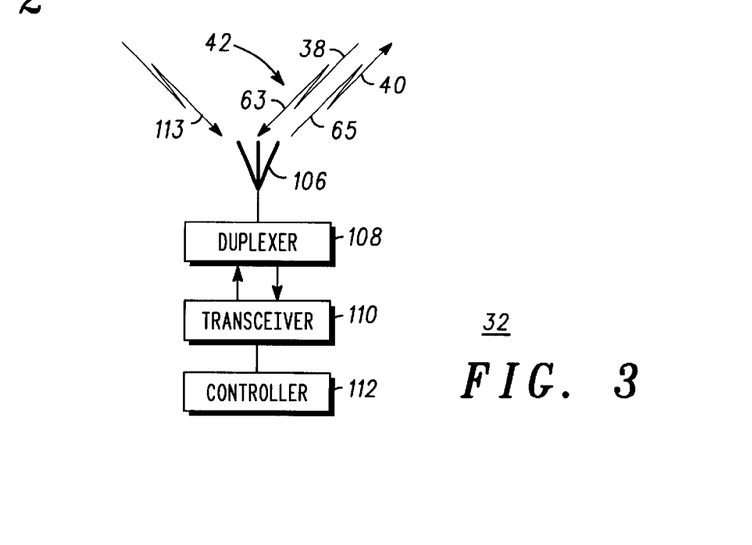
FIG. 3 shows a simplified block diagram of a subscriber unit in accordance with the preferred embodiment of the present invention.

FIG. 3 shows a simplified block diagram of first subscriber unit 32 in accordance with the preferred embodiment of the present invention. First subscriber unit 32 includes an antenna 106 coupled to a duplexer 108 to accommodate concurrent receipt of first data 63 over downlink frequency band 38 and transmission of second data 65 over uplink frequency band 40 of second link 42. The duplexer can be deleted for low data rate subscriber units. These units can operate in one time slot only where TDD operation is possible and transmission/reception isolation is not necessary. Transmission in more than one time slot is necessary for high rate terminals. This can only be accomplished by subscriber units capable of full duplex operation and requires the duplexer 108.

A transceiver 110 is coupled to duplexer 108 to complete the communication path. A controller 112 is coupled to transceiver 110. Controller 112, among other things, controls the frequency and timing parameters upon which transceiver 110 operates. First subscriber unit 32 includes other elements (not shown), such as a display panel, keypad, audio circuit, and so forth that are not crucial to the understanding of the present invention. In addition, the description provided herein for first subscriber unit 32 applies to second subscriber unit 33 as well.

Transceiver 110 is a multi-channel Time Division/Frequency Division Multi Access (TD/FDMA) transceiver capable of transmitting and receiving on at least two different selectable frequency bands as directed by controller 112. Transceiver 110 desirably operates using acquisition channels and traffic channels included in frequency bands 38 and 40. An acquisition channel 113, broadcast by first satellite 22 (see FIG. 1) and possibly repeated through terrestrial repeater 30 (FIG. 1) is monitored by first subscriber unit 32, is primarily used during access protocols when first subscriber unit 32 desires access to satellite-based communications system 20 or when a hand-off is necessary. First satellite 22 transmits a flag (not shown) over acquisition channel 113 informing first subscriber unit 32 (FIG. 1) when to refrain from receiving downlink frequency band 38 and when to refrain from transmitting uplink frequency band 40 (discussed below). The flag is any suitably configured data, which instructs first subscriber unit 32 to refrain from communicating with second satellite 24 (FIG. 1).

Traffic channels are used for data exchange after access has been obtained or a hand-off is made. Traffic channels are two-way channels that are assigned to particular subscriber units 32 by communications system 20 during certain TDMA frames. By way of example, first link 36 includes traffic channels and at least one acquisition channel between terrestrial repeater 30 and first satellite 22, and second link 42 includes traffic channels and at least one acquisition channels between terrestrial repeater 30 and subscriber unit 32. However, the combination of first and second links 36 and 42 forms the half-duplex circuit between first satellite 22 and subscriber unit 32. Of course, those skilled in the art will recognize that the two-way channel assigned to a particular subscriber unit is a particular time slot or group of time slots in a TDMA frame on a particular frequency or set of frequencies.

Figure 4:
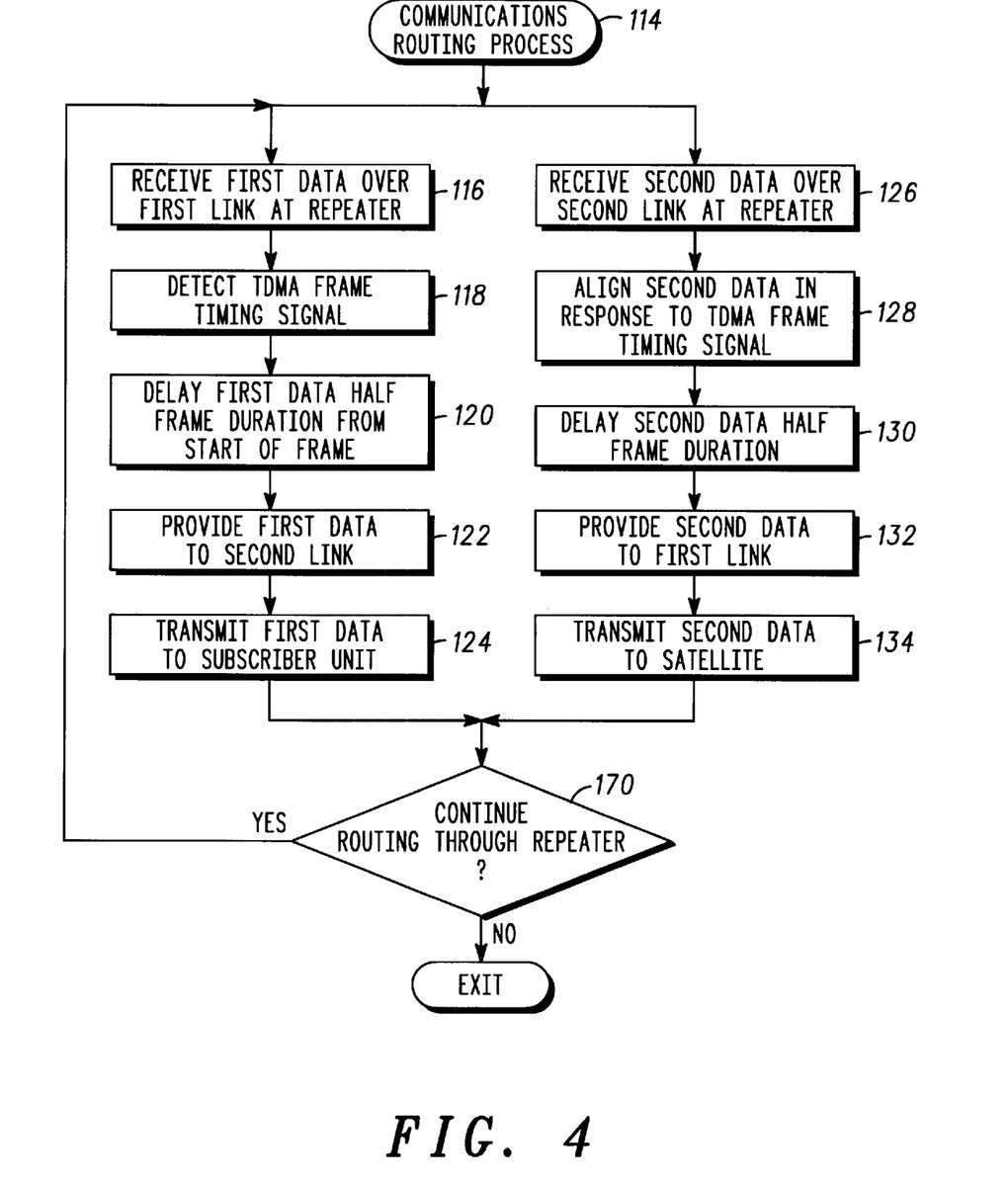
FIG. 4 shows a flowchart of a process for routing radio communications through the terrestrial repeater in accordance with the preferred embodiment of the present invention.

FIG. 4 shows a flowchart of a process 114 for routing radio communications through terrestrial repeater 30 (FIG. 1) in accordance with the preferred embodiment of the present invention. Process 114 is performed in response to pre-programmed location information for the terrestrial repeaters 30 in system 20, as discussed above. The pre-programmed location information informs each of first, second, and third satellites 22, 24, and 26 when to refrain from receiving and transmitting over particular frequency bands so that radio communication services will be routed through terrestrial repeater 30.

During process 114, downlink delay circuit 68 (FIG. 2) of terrestrial repeater 30 performs a set of tasks while uplink delay circuit 72 (FIG. 2) performs a parallel set of tasks. In the exemplary embodiment, downlink delay circuit 68 performs tasks 116, 118, 120, 122, and 124 while uplink delay circuit 72 performs tasks 126, 128, 130, 132, and 134.

Task 116 causes first transceiver antenna 62 (FIG. 2) to receive first data 63 over downlink frequency band 38 of first link 36. Upon receipt of first data 63, task 118 causes frame detector 98 (FIG. 2) to detect a TDMA frame timing signal as discussed above FIG. 5 shows a timing diagram 142 in response to radio communications routing process 114 in accordance with the preferred embodiment of the present invention. For illustrative purposes, timing diagram 142 shows TDMA frames 144 divided into a plurality of time slots 146 and time guard bands 148. In the exemplary embodiment, a first sub-frame 150 of TDMA frame 144 includes four of time slots 146 and one of time guard bands 148. A second sub-frame 152 of TDMA frame 144 follows first sub-frame 150. Second sub-frame 152 also includes four of time slots 146 and one of time guard bands 148. Time guard bands 148 are time intervals left vacant on a channel to provide a margin of safety against interference in the time domain between sequential operations. For simplicity of illustration, the time interval for each of time guard bands 148 is shown substantially equivalent to the duration of one of time slots 146. However, this is not limiting, and those skilled in the art will recognize that other embodiments can be envisioned in which the time interval for each of time guard bands 148 is not equal to the duration of one of time slots 146.

Figure 5:
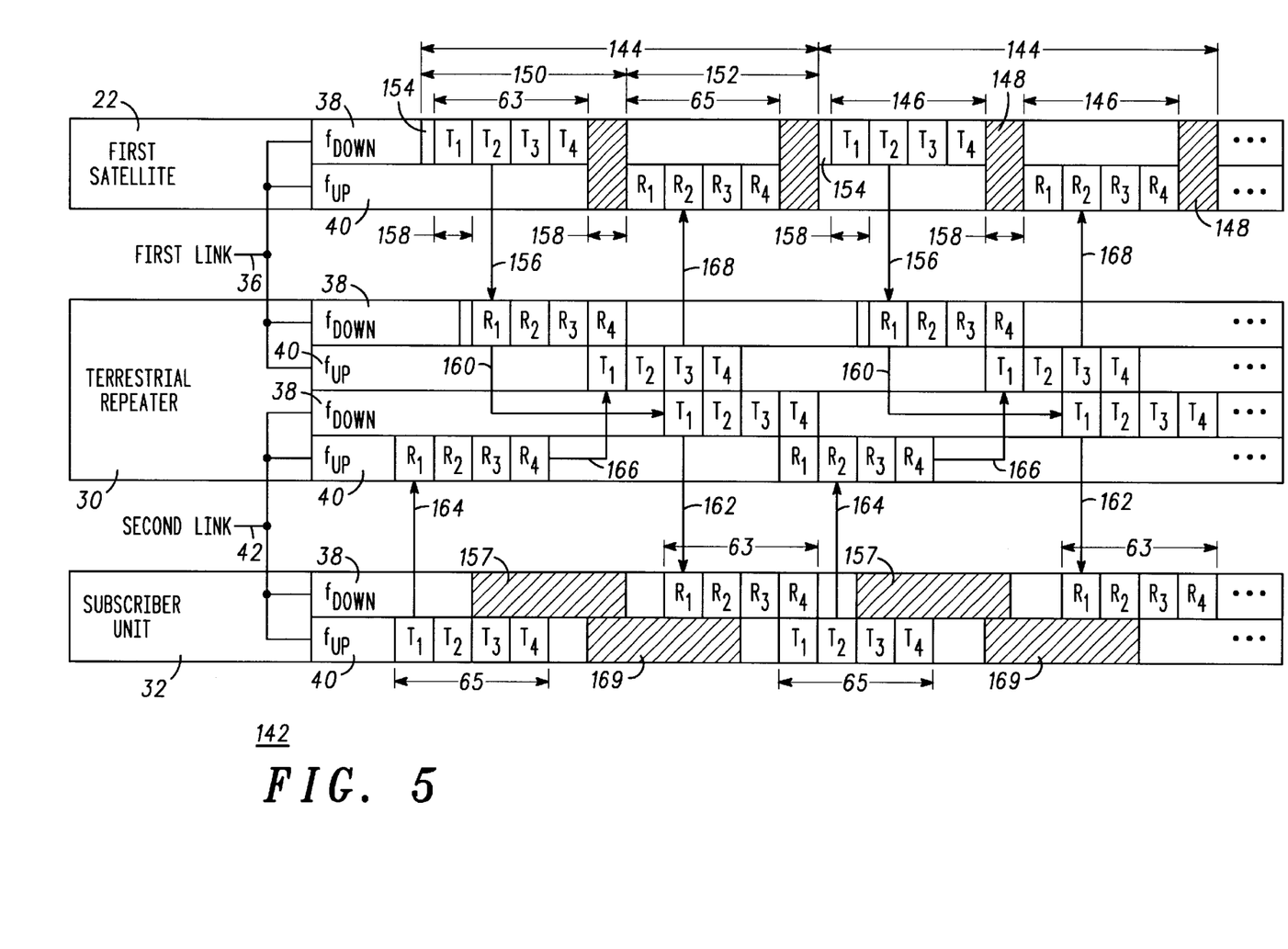
FIG. 5 shows a timing diagram in response to the radio communications routing process in accordance with the preferred embodiment of the present invention.

A TDMA frame timing signal 154, generally activated at the beginning of each of TDMA frames 144, precedes first data 63 in first sub-frame 150 and is used to delineate each of TDMA frames 144. In response to task 116, task 118 of process 114 (FIG. 4) causes frame detector 98 (FIG. 2) to detect TDMA frame timing signal 154 in each of TDMA frames 144.

With continued reference to both timing diagram 142 (FIG. 5) and communications routing process 114 (FIG. 4), in response to detection of TDMA frame timing signal 154 in task 118, process 114 proceeds with task 120. Task 120 causes downlink delay circuit 68 (FIG. 2) of terrestrial repeater 30 to delay first data 63 received at terrestrial repeater 30 by one half of a frame duration.

In the preferred embodiment, each of TDMA frames 144 may be expressed as having a frame duration which is the summation of the length of time for each of time slots 146 and time guard bands 148 in each TDMA frame. A duration of each of first and second sub-frames 150 and 152 is one half of the frame duration of TDMA frame 144, or four of time slots 146 and one of time guard bands 148.

In the exemplary embodiment, first data 63 is transmitted over downlink frequency band ($f_{down}$) 38 from first satellite 22 in first sub-frame 150 as depicted by $T_1$, $T_2$, $T_3$, and $T_4$, and as illustrated by a downward arrow 156. First data 63 is received at terrestrial repeater 30 over downlink frequency band ($f_{down}$) 38, as depicted by $R_1$, $R_2$, $R_3$, and $R_4$, following a propagation delay 158. For simplicity of illustration, propagation delay 158 is illustrated as being approximately one time slot in duration, but this is not a requirement. Accordingly, in the exemplary embodiment, first data 63 is delayed by the duration of four of time slots 146 plus one of time guard bands 148 as represented by a delay arrow 160. To prevent problems with interference, transceiver 108 (FIG. 3) of first subscriber unit 32 refrains from receiving downlink frequency band 38 while terrestrial repeater 30 is receiving downlink frequency band 38 from first satellite 22 as shown in timing diagram 142 by a block 157, in response to the flag received over acquisition channel 113 (FIG. 3).

Following task 120, task 122 causes first data 63 to be provided to second link 42. In other words, first delay circuit 68 (FIG. 3) provides first data 63 at output 76 (FIG. 2) for processing by second duplexer 74 (FIG. 2) in response to first enabling signal 102 (FIG. 2) generated by timing generator 100. Delay arrow 160 of timing diagram 142 also represents this provision of first data 63 to second link 42.

Following tasks 120 and 122, process 114 proceeds to task 124. Task 124 causes first data 63 to be transmitted from second transceiver antenna 80 over downlink frequency band 38 of second link 42. As shown in timing diagram 142, any propagation delay between terrestrial repeater 30 and subscriber unit 32 is inconsequential relative to propagation delay 158. Thus, first data 63 is received at subscriber unit 32 delayed one half frame with respect to its receipt at terrestrial repeater 30 as illustrated by a downward arrow 162.

The objective of tasks 126, 128, 130, 132, and 134 of process 114 is to cause second data 65 to be received at first satellite 22 during second sub-frame 152 of TDMA frame 144 over uplink frequency band 40 following the time division duplex (TDD) frame structure of first satellite 22. In order to achieve this objective, task 126 is performed substantially concurrent to receiving task 116.

Task 126 causes terrestrial repeater 30 to receive second data 65 over uplink frequency band 40 of second link 42. As shown in timing diagram 142, second data 65 is transmitted over uplink frequency band ($f_{up}$) 40 of second link 42 from first subscriber unit 32 as depicted by $T_1$, $T_2$, $T_3$, and $T_4$. Second data 65 is subsequently received at terrestrial repeater 30 over uplink frequency band ($f_{up}$) 40 of second link 42, as depicted by $R_1$, $R_2$, $R_3$, and $R_4$, and as illustrated by an upward arrow 164.

In connection with task 126, task 128 aligns second data 65 in response to TDMA frame timing signal 154. In other words, task 128 causes first subscriber unit 32 and/or terrestrial repeater 30 to adjust their transmit and receive schedules to accommodate the frame timing of first satellite 22. First subscriber unit 32 also determines when first satellite 22 expects to receive second data 65 so as to determine the time to transmit based on the expected time of arrival and propagation delay 158. For example, as shown in timing diagram 142, first subscriber unit 32 begins transmitting sooner than first satellite 22 so that second data 65 is eventually received by first satellite 22 synchronized with second sub-frame 152.

In response to receipt task 126 and alignment task 128, task 130 causes uplink delay circuit 72 (FIG. 2) of terrestrial repeater 30 to delay second data by half of the duration of each of TDMA frames 144. In other words, in the exemplary embodiment second data 65 is delayed by the duration of four of time slots 146 plus one of time guard bands 148, as represented by a delay arrow 166.

Following task 130, task 132 causes second data 65 to be provided to first link 36. In other words, uplink delay circuit 72 (FIG. 2) provides second data 65 at output 70 (FIG. 2) for processing by first duplexer 64 (FIG. 2) in response to second enabling signal 104 (FIG. 2) generated by timing generator 100. Delay arrow 166 of timing diagram 142 also represents this provision of second data 65 to first link 36.

Following tasks 130 and 132, process 114 proceeds to task 134. Task 134 causes second data 65 to be transmitted from first transceiver antenna 62 (FIG. 2) over uplink frequency band 40 of first link 36. Like receiving tasks 116 and 126, transmitting task 134 is performed substantially concurrent with transmitting task 124. In the exemplary embodiment, second data 65 is transmitted over uplink frequency band ($f_{up}$) 40 of first link 36 from terrestrial repeater 30 as depicted by $T_1$, $T_2$, $T_3$, and $T_4$ and as illustrated by an arrow 168. Second data 65 is received at first satellite 22 over uplink frequency band ($f_{up}$) 40 of first link 36, as depicted by $R_1$, $R_2$, $R_3$, and $R_4$, following propagation delay 158 and synchronized with second sub-frame 152.

During task 134, in order to prevent problems with interference, transceiver 108 (FIG. 3) of first subscriber unit 32 refrains from transmitting over uplink frequency band 40 while terrestrial repeater 30 is transmitting over uplink frequency band 40, in response to the flag received over acquisition channel 113 (FIG. 3).

Following the substantially concurrent transmission of first data 63 to first subscriber unit 32 in task 124 with the transmission of second data 65 to first satellite 22 in task 134, process 114 proceeds to a query task 170. Query task 170 determines if communications between subscriber unit 32 and first satellite 22 should continue to be routed through terrestrial repeater 30.

Query task 170 is not actively performed by the elements of communications system 20. Rather, query task 170 is responsive to the predetermined terrestrial repeater location information known to service center 28 (FIG. 1) and/or first satellite 22. Communications between first subscriber unit 32 and first satellite 22 desirably continue to be routed through terrestrial repeater 30 for the duration of the call and while first coverage area 34 (FIG. 1) overlaps repeater coverage area 41 (FIG. 1). Thus, when communications are to continue to be routed through terrestrial repeater 30 (FIG. 1), process 114 loops back to parallel tasks 116 and 126 to continue concurrent receipt of data from first satellite 22 and first subscriber unit 32 at terrestrial repeater 30.

However, when query task 170 determines that communications are not to continue to be routed through terrestrial repeater 30, process 114 exits. In other words, in response to the predetermined terrestrial repeater location information, first satellite 24 may resume the dual coverage implementation of TDD pair 50 (FIG. 1). Alternatively, at query task 170, first satellite 22 may detect end of call signaling indicating the completion of communications with first subscriber unit 32. However, process 114 may be repeated whenever first, second, or third satellites 22, 24, and 26 are instructed to refrain from transmitting and receiving In summary, a satellite-based communications system has been described. The communications system includes a terrestrial repeater for mitigating the undesirable effects of signal strength degradation, i.e., fading, that occurs during signal transmission between the satellite and the receiving unit. Moreover, the terrestrial repeater takes advantage of the conventionally idle frequency spectrum in a TD/FDMA system to maintain signal quality by transmitting radio communication signals to each of a satellite and a subscriber unit over concurrent time slots of two different frequency bands, and by receiving radio communication signals from each of the satellite and the subscriber unit over concurrent time slots of the two different frequency bands.

Although the preferred embodiments of the invention have been illustrated and described in detail, it will be readily apparent to those skilled in the art that various modifications may be made therein without departing from the spirit of the invention or from the scope of the appended claims. For example, the block diagrams and the steps identified herein can be organized differently than described while achieving equivalent results. In addition, the number of sub-frames within a frame and the number of time slots within a sub-frame could be different from that described in the preferred embodiment. Since system timing is referenced to the satellite frame clock, propagation delays between the satellite and the terrestrial repeater force early transmission to the satellite and late reception from the satellite resulting in a time overlap between signal receipt and signal transmission at the terrestrial repeater and the subscriber units. This time overlap results in the inclusion of duplexers in the terrestrial repeater and the subscriber units so that they can transmit signals at the same time that they are receiving signals. However, the duplexers in the terrestrial repeater and in the subscriber unit need not be implemented if the overlapping receive and transmit time slots are left vacant, thus simplifying system design.

What is claimed is:

1. A communications system comprising:

a communication satellite transmitting first data during a first sub-frame of a time division multiple access (TDMA) frame and receiving second data during a second sub-frame of said TDMA frame, said second sub-frame following said first sub-frame;

a subscriber unit configured to receive said first data and transmit said second data; and a terrestrial repeater receiving said first data from said communication satellite using a first link during said first sub-frame, delaying said first data by substantially a sub-frame duration, and transmitting said first data to said subscriber unit using a second link, and said terrestrial repeater receiving said second data from said subscriber unit using said second link, delaying said second data by substantially said sub-frame duration, and transmitting said second data to said communication satellite using said first link during said second sub-frame.

2. A communications system as claimed in claim 1 wherein:

said first link includes a first frequency band and a second frequency band, said first data being transmitted to said terrestrial repeater over said first frequency band, and said second data being transmitted to said communication satellite over said second frequency band; and said second link includes said first frequency band and said second frequency band, said first data being transmitted to said subscriber unit over said first frequency band and said second data being transmitted to said terrestrial repeater over said second frequency band.

3. A communications system as claimed in claim 1 wherein said terrestrial repeater comprises:

a first transceiver antenna establishing said first link with said communication satellite;

a second transceiver antenna establishing said second link with said subscriber unit;

a first delay circuit coupled between said first and second transceiver antennas for delaying said first data;

a second delay circuit coupled between said first and second transceiver antennas for delaying said second data;

a detector in communication with said first delay circuit for detecting a TDMA frame timing signal; and a timing generator coupled to said detector and in communication with said first delay circuit and said second delay circuit, said timing generator activating said first delay circuit to provide said first data to said second transceiver antenna and activating said second delay circuit to provide said second data to said first transceiver antenna in response to said TDMA frame timing signal.

4. A communications system as claimed in claim 3 wherein said terrestrial repeater further comprises a duplexer in communication with said first transceiver antenna, an input of said first delay circuit, and an output of said second delay circuit, said duplexer enabling substantially concurrent receipt of said first data from said communication satellite and transmission of said second data to said communication satellite.

5. A communications system as claimed in claim 4 wherein:

said first link includes a first frequency band and a second frequency band, said first data being transmitted to said terrestrial repeater over said first frequency band, and said second data being transmitted to said communication satellite over said second frequency band; and said terrestrial repeater further comprises a filter in communication with said output of said second delay circuit and an input of said duplexer, said filter passing said second frequency band and substantially suppressing said first frequency band.

6. A communications system as claimed in claim 3 wherein said terrestrial repeater further comprises a duplexer in communication with said second transceiver antenna, an output of said first delay circuit, and an input of said second delay circuit, said duplexer enabling substantially concurrent transmission of said first data to said subscriber unit and receipt of said second data from said subscriber unit.

7. A communications system as claimed in claim 6 wherein:

said second link includes a first frequency band and a second frequency band, said first data being transmitted to said subscriber unit over said first frequency band, and said second data being transmitted to said terrestrial repeater over said second frequency band; and said terrestrial repeater further comprises a filter in communication with said output of said first delay circuit and an input of said duplexer, said filter passing said first frequency band and substantially suppressing said second frequency band.

8. A communications system as claimed in claim 1 wherein said subscriber unit comprises:

an antenna;

a transceiver coupled said antenna; and a duplexer coupled to said transceiver, said duplexer enabling substantially concurrent receipt of said first data and transmission of said second data over said second link.

9. A communications system as claimed in claim 1 wherein:

said first sub-frame forms substantially a first half of said TDMA frame;

said second sub-frame forms substantially a second half of said TDMA frame; and said sub-frame duration is approximately one half of said TDMA frame.

10. A communications system as claimed in claim 1 wherein said communication satellite transmits a flag instructing said subscriber unit to refrain from receiving during said first sub-frame and to refrain from transmitting during said second sub-frame.

11. A communications system as claimed in claim 1 wherein said communication satellite is a first communication satellite providing radio communication services in a first coverage area, said subscriber unit is a first subscriber unit, and said communications system further comprises:

a second communication satellite providing said radio communication services in a second coverage area, said second coverage area overlapping said first coverage area to form a dual coverage area; and a second subscriber unit located within said dual coverage area such that said first and second communication satellites form a time division duplex (TDD) pair configured for concurrent provision of said radio communication services to said second subscriber unit over a first TDD link between said first communication satellite and said second subscriber unit and a second TDD link between said second communication satellite and said second subscriber unit.

12. A communications system as claimed in claim 11 wherein said second communication satellite is configured to refrain from communicating with said first subscriber unit.

13. In a communications system having a communication satellite, a subscriber unit, and a terrestrial repeater, a method of routing communications through said terrestrial repeater comprising:

a) forming a first link between said communication satellite and said terrestrial repeater, said first link including a first frequency band and a second frequency band;

b) forming a second link between said terrestrial repeater and said subscriber unit, said second link including said first frequency band and said second frequency band;

c) receiving first data over said first frequency band of said first link during a first half frame of a time division multiple access (TDMA) frame at said terrestrial repeater;

d) delaying said first data by a duration substantially equal to one half of said TDMA frame;

e) transmitting said first data over said first frequency band of said second link;

f) receiving second data over said second frequency band of said second link at said terrestrial repeater;

g) delaying said second data by said duration; and h) transmitting said second data over said second frequency band of said first link for arrival at said communication satellite during a second half frame of said TDMA frame.

14. A method as claimed in claim 13 further comprising:

detecting a TDMA frame timing signal in said TDMA frame during said activity c);

providing said first data to said second link in response to said TDMA frame timing signal; and providing said second data to said first link in response to said TDMA frame timing signal.

15. A method as claimed in claim 13 further comprising performing said activities c) and f) substantially concurrently.

16. A method as claimed in claim 13 further comprising performing said activities e) and h) substantially concurrently.

17. A communications system comprising:

a communication satellite transmitting first data during a first sub-frame of a time division multiple access (TDMA) frame and receiving second data during a second sub-frame of said TDMA frame, said second sub-frame following said first sub-frame;

a subscriber unit configured to receive said first data and transmit said second data; and a terrestrial repeater forming a first link with said communication satellite and a second link with said subscriber unit, said first link having a first frequency band and a second frequency band, and said second link having said first frequency band and said second frequency band, said terrestrial repeater receiving said first data from said communication satellite over said first frequency band of said first link during said first sub-frame, delaying said first data by substantially a sub-frame duration, and transmitting said first data to said subscriber unit over said first frequency band of said second link, and said terrestrial repeater receiving said second data from said subscriber unit over said second frequency band of said second link, delaying said second data by substantially said sub-frame duration, and transmitting said second data to said communication satellite over said second frequency band of said first link during said second sub-frame.

18. A communications system as claimed in claim 17 wherein said terrestrial repeater comprises:

a first transceiver antenna establishing said first link with said communication satellite;

a second transceiver antenna establishing said second link with said subscriber unit;

a first delay circuit coupled between said first and second transceiver antennas for delaying said first data;

a second delay circuit coupled between said first and second transceiver antennas for delaying said second data;

a first duplexer coupled to each of said first transceiver antenna, an input of said first delay circuit, and an output of said second delay circuit, said first duplexer enabling substantially concurrent receipt of said first data from said communication satellite and transmission of said second data to said communication satellite;

a second duplexer coupled between said second transceiver antenna, an output of said first delay circuit, and an input of said second delay circuit, said second duplexer enabling substantially concurrent transmission of said first data to said subscriber unit and receipt of said second data from said subscriber unit;

a detector in communication with said first delay circuit for detecting a TDMA frame timing signal; and a timing generator coupled to said detector and in communication said first delay circuit and said second delay circuit, said timing generator activating said first delay circuit to provide said first data to said second transceiver antenna and activating said second delay circuit to provide said second data to said first transceiver antenna in response to said TDMA frame timing signal.

19. A communications system as claimed in claim 17 wherein said communication satellite is a first communication satellite providing radio communication services in a first coverage area, said subscriber unit is a first subscriber unit, and said communications system further comprises:

a second communication satellite providing said radio communication services in a second coverage area, said second coverage area overlapping said first coverage area to form a dual coverage area; and a second subscriber unit located within said dual coverage area, wherein said first and second communication satellites form a time division duplex (TDD) pair configured for concurrent provision of said radio communication services to said second subscriber unit over a first TDD link between said first communication satellite and said second subscriber unit and a second TDD link between said second communication satellite and said second subscriber unit.

20. A communications system as claimed in claim 19 wherein said second communication satellite is configured to refrain from communicating with said first subscriber unit.

* * * * *